United States Patent
Zhang et al.

(10) Patent No.: US 12,052,181 B2
(45) Date of Patent: Jul. 30, 2024

(54) GENERIC LAYER INDEPENDENT FRAGMENTATION OF NON-INTERNET PROTOCOL FRAMES

(71) Applicant: Juniper Networks, Inc., Sunnyvale, CA (US)

(72) Inventors: Zhaohui Zhang, Westford, MA (US); Kireeti Kompella, Los Altos, CA (US); Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/192,709

(22) Filed: Mar. 30, 2023

(65) Prior Publication Data
US 2023/0246977 A1    Aug. 3, 2023

Related U.S. Application Data

(63) Continuation of application No. 17/249,741, filed on Mar. 11, 2021, now Pat. No. 11,627,093.
(Continued)

(51) Int. Cl.
*H04L 47/36* (2022.01)
*H04L 45/74* (2022.01)

(52) U.S. Cl.
CPC ............ *H04L 47/365* (2013.01); *H04L 45/74* (2013.01)

(58) Field of Classification Search
CPC ......... H04L 47/36; H04L 45/74; H04L 69/22; H04L 9/40; H04L 12/6418; H04L 45/26;
(Continued)

(56) References Cited

U.S. PATENT DOCUMENTS

| 7,333,508 B2 * | 2/2008 | Rabie .................... H04L 12/413 370/428 |
| 7,417,995 B2 * | 8/2008 | Rabie .................... H04L 12/413 370/395.53 |

(Continued)

OTHER PUBLICATIONS

Bradner S., "Key Words for Use in RFCs to Indicate Requirement Levels," BCP 14, RFC 2119, Mar. 1997, 3 Pages.
(Continued)

*Primary Examiner* — Man U Phan
(74) *Attorney, Agent, or Firm* — Harrity & Harrity, LLP

(57) ABSTRACT

A network device may receive a non-Internet protocol (non-IP) frame with a particular size and may compare the particular size to a maximum transmission unit (MTU) associated with a path between the network device and another network device. The network device may divide the non-IP frame into fragments, based on the particular size being greater than the MTU and may prepend generic fragmentation headers to the fragments to generate fragments with headers, based on the particular size being greater than the MTU. The network device may add generic fragmentation header labels and transport labels to the fragments with the headers to generate fragments with headers and labels, based on the particular size being greater than the MTU. The network device may transmit the fragments with the headers and the labels to the other network device, via the path, based on the particular size being greater than the MTU.

20 Claims, 9 Drawing Sheets

Related U.S. Application Data

(60) Provisional application No. 63/198,630, filed on Oct. 30, 2020.

(58) Field of Classification Search
CPC ..... H04L 47/365; H04L 12/805; H04L 29/06; H04L 12/741; H04L 12/721; H04W 28/20
USPC ......................................................... 370/230
See application file for complete search history.

(56) References Cited

U.S. PATENT DOCUMENTS

| | | | | |
|---|---|---|---|---|
| 7,525,972 B2* | 4/2009 | Townsley | ............ | H04L 12/2859 370/395.5 |
| 7,773,599 B1* | 8/2010 | Lim | ............ | H04L 1/0061 370/392 |
| 7,804,780 B2* | 9/2010 | Baratakke | ............ | H04L 69/166 370/235 |
| 7,916,632 B1* | 3/2011 | Lim | ............ | H04L 45/60 370/229 |
| 7,924,882 B2* | 4/2011 | Nagai | ............ | H04L 47/36 370/468 |
| 7,936,758 B2* | 5/2011 | Lim | ............ | H04L 49/3009 370/392 |
| 8,121,135 B2* | 2/2012 | Thathapudi | ............ | H04L 47/10 370/252 |
| 8,204,080 B2* | 6/2012 | Townsley | ............ | H04L 12/2859 709/230 |
| 9,356,879 B2* | 5/2016 | Sundar | ............ | H04L 47/365 |
| 9,660,902 B2* | 5/2017 | Suzuki | ............ | H04L 45/28 |
| 9,893,984 B2* | 2/2018 | Sundar | ............ | H04L 9/40 |
| 9,923,835 B1* | 3/2018 | Singh | ............ | H04L 12/4633 |
| 10,212,095 B2* | 2/2019 | Raj | ............ | H04L 67/10 |
| 10,798,014 B1* | 10/2020 | Krishnamurthy | ............ | H04L 47/36 |
| 10,827,041 B2* | 11/2020 | Dutta | ............ | H04L 69/22 |
| 11,310,350 B2* | 4/2022 | Sarikaya | ............ | H04L 61/2567 |
| 11,368,564 B2* | 6/2022 | Dutta | ............ | H04L 47/36 |
| 11,627,093 B1 | 4/2023 | Zhang et al. | | |
| 2021/0084126 A1* | 3/2021 | Dutta | ............ | H04L 69/166 |
| 2022/0166709 A1* | 5/2022 | Barman | ............ | H04L 45/02 |

OTHER PUBLICATIONS

Deering S., et al., "Internet Protocol, Version 6 (IPv6) Specification," STD 86, RFC 8200, Jul. 2017, 42 Pages.

Hopps C., "Routing IPV6 with IS-IS," RFC 5308, Oct. 2008, 7 Pages.

Kent S., "IP Encapsulating Security Payload (ESP)," Dec. 2005, 45 pages, XP055632415. Retrieved from the Internet:[URL:https://tools.ietf.org/html/rfc4303].

Leiba B., "Ambiguity of Uppercase vs Lowercase in RFC 2119 Key Words," BCP 14, RFC 8174, May 2017, 4 Pages.

Li T., et al., "IS-IS Extensions for Traffic Engineering," RFC 5305, Oct. 2008, 17 Pages.

Przygienda T., et al., "M-ISIS: Multi Topology (MT) Routing in Intermediate System to Intermediate Systems (IS-ISs)," RFC 5120, Feb. 2008, 14 Pages.

Psenak et al., "OSPFv2 Prefix/Link Attribute Advertisement," RFC 7684, Nov. 2015, 15 Pages.

* cited by examiner

GENERIC LAYER INDEPENDENT FRAGMENTATION OF NON-INTERNET PROTOCOL FRAMES

CROSS-REFERENCE TO RELATED APPLICATION

This application is a continuation of U.S. patent application Ser. No. 17/249,741, filed Mar. 11, 2021 (now U.S. Pat. No. 11,627,093), which claims priority to U.S. Provisional Patent Application No. 63/198,630, filed on Oct. 30, 2020, the contents of which are incorporated herein by reference in their entireties.

BACKGROUND

Internet protocol (IP) fragmentation is an IP process that breaks a packet into smaller fragments, so that the fragments can pass through a link with a smaller maximum transmission unit (MTU) than a size of the packet. The fragments may be reassembled by a receiving network device.

SUMMARY

In some implementations, a method may include receiving a non-Internet protocol (non-IP) frame with a particular size and comparing the particular size to a maximum transmission unit associated with a path between the network device and another network device. The method may include dividing the non-IP frame into fragments, based on the particular size being greater than the maximum transmission unit, and prepending generic fragmentation headers to the fragments to generate fragments with headers, based on the particular size being greater than the maximum transmission unit. The method may include adding generic fragmentation header labels and transport labels to the fragments with the headers to generate fragments with headers and labels, based on the particular size being greater than the maximum transmission unit, and transmitting the fragments with the headers and the labels to the other network device, via the path, based on the particular size being greater than the maximum transmission unit.

In some implementations, a network device includes one or more memories and one or more processors to receive a non-Internet protocol (non-IP) frame with a particular size, and compare the particular size to a maximum transmission unit associated with a path between the network device and another network device, wherein the maximum transmission unit takes into account any encapsulation overhead associated with transmitting the non-IP frame over the network. The one or more processors may transmit the non-IP frame to the other network device, via the path, based on the particular size being less than the maximum transmission unit associated with the path. Based on the particular size being greater than the maximum transmission unit, the one or more processors may divide the non-IP frame into fragments; prepend generic fragmentation headers to the fragments to generate fragments with headers; add generic fragmentation header labels and transport labels to the fragments with the headers to generate fragments with headers and labels; and transmit the fragments with the headers and the labels to the other network device, via the path.

In some implementations, a non-transitory computer-readable medium may store a set of instructions that includes one or more instructions that, when executed by one or more processors of a network device, cause the network device to receive a non-Internet protocol (non-IP) frame with a particular size, wherein the non-IP frame includes one of a multiprotocol label switching frame, a bit index explicit replication frame, or an Ethernet frame. The one or more instructions may cause the network device to compare the particular size to a maximum transmission unit associated with a path between the network device and another network device, and divide the non-IP frame into fragments, based on the particular size being greater than the maximum transmission unit. The one or more instructions may cause the network device to prepend generic fragmentation headers to the fragments to generate fragments with headers, based on the particular size being greater than the maximum transmission unit, and add generic fragmentation header labels and transport labels to the fragments with the headers to generate fragments with headers and labels, based on the particular size being greater than the maximum transmission unit. The one or more instructions may cause the network device to transmit the fragments with the headers and the labels to the other network device, via the path, based on the particular size being greater than the maximum transmission unit.

DETAILED DESCRIPTION

Figure 1A:
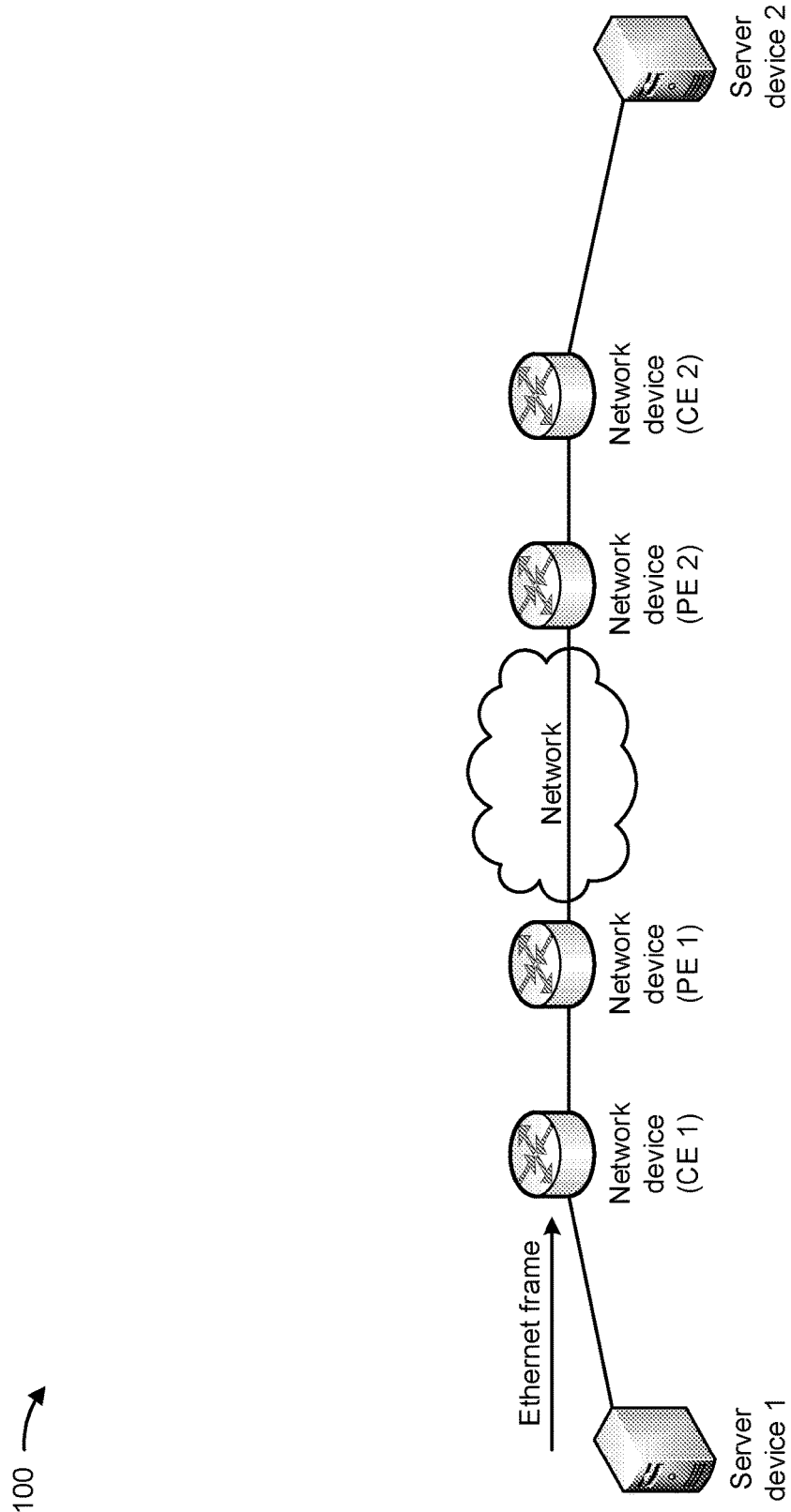
FIGS. 1A-1E are diagrams of an example implementation described herein.

The following detailed description of example implementations refers to the accompanying drawings. The same reference numbers in different drawings may identify the same or similar elements.

A provider network may provide Layer 1 or Layer 2 services over a Layer 3 network. Layer 1 services include what is called circuit emulation, where raw bits sent from customer sites are transported over the provider network. Layer 2 services include point-to-point protocol (PPP), frame relay, and asynchronous transfer mode (ATM), although these are diminishing in prevalence, and Ethernet services, such as Layer 2 circuit label-switched paths (L2CKT), a virtual private local area network (LAN) service (VPLS), Ethernet virtual private network (EVPN), and/or the like. Frame types provided by such services may be referred to as non-Internet protocol (IP) frames. Non-IP frames that a provider edge (PE) network device receives from a customer edge (CE) network device may have a larger size than a PE-PE path maximum transmission unit (MTU) in the provider network. This may be due to the provider network being built upon virtual connections (e.g., L2CKT) provided by another infrastructure provider, or due to a customer network utilizing larger frames, and the provider network not utilizing larger frames. Even when non-IP frames received by a PE fit within the PE-PE MTU, the overhead imposed by the PE to transport this frame across the provider network may cause the packet to exceed the MTU. In such situations, the provider network has a few choices, such as require users to change the MTU, drop the packet, or fragment the packet to fit within the MTU. Requiring users to change the MTU size may be logistically difficult and dropping packets creates network communication errors. However, Layer 1 and Layer 2 protocols do not allow for fragmentation, and neither does multiprotocol label switching (MPLS).

Thus, in order to transmit the larger frames across the provider network, the PE network device may encapsulate the larger frames in IP (with or without generic routing encapsulation (GRE)) and then fragment the IP packets or frames. Even if MPLS is available for transport, IP is used instead (e.g., MPLS over IP/GRE) to enable fragmentation. This may not be wanted in certain deployment scenarios, where MPLS transportation is desired, IP encapsulation overhead is undesired, or traffic engineering is desired. Thus, current fragmentation techniques waste computing resources (e.g., processing resources, memory resources, communication resources, and/or the like), networking resources, and/or the like associated with creating unnecessary IP encapsulation overhead, creating network congestion with the IP encapsulation overhead, dropping packets due to the network congestion, and/or the like.

Some implementations described herein relate to a network device that performs generic layer independent fragmentation of non-IP frames. For example, the network device may receive a non-IP frame with a particular size and may compare the particular size to an MTU associated with a path between the network device and another network device. The network device may divide the non-IP frame into fragments, based on the particular size being greater than the MTU and may prepend generic fragmentation headers to the fragments to generate fragments with headers, based on the particular size being greater than the MTU. The network device may add generic fragmentation header labels and transport labels to the fragments with the headers to generate fragments with headers and labels, based on the particular size being greater than the MTU and may transmit the fragments with the headers and the labels to the other network device, via the path, based on the particular size being greater than the MTU.

While non-IP (e.g., Ethernet) frames are used as an example herein, in some implementations, the generic layer independent fragmentation may be utilized with packets, other information, and/or the like. Furthermore, certain functions currently provided by IPv6 may be extracted out, such as a security (ESP) or an authentication header. Implementations described herein relate to fragmentation but may also be to other functions besides fragmentation.

In this way, the network device performs generic layer independent fragmentation of non-IP frames. The network device may fragment an Ethernet frame without incurring IP overhead or requiring IP transportation. The network device may extract an independent fragmentation function out of IP for these use cases. For example, if an Ethernet type is assigned for the generic fragmentation header, the network device may utilize the generic fragmentation header to fragment frames without involving IP or MPLS. This, in turn, conserves computing resources, networking resources, and/or the like that would otherwise have been wasted in creating unnecessary IP encapsulation overhead, creating network congestion with the IP encapsulation overhead, dropping packets due to the network congestion, and/or the like. Similarly, if an MPLS label (e.g., either a special purpose label, or one provisioned or signaled for this purpose) includes a generic fragmentation header, an MPLS frame can be fragmented.

FIGS. 1A-1E are diagrams of an example 100 associated with performing generic layer independent fragmentation of non-IP frames. As shown in FIGS. 1A-1E, example 100 includes server devices connected to CE network devices, PE network devices connected to the CE network devices, and a network (e.g., a provider network, an MPLS network, and/or another type of network) connecting the PE network devices. Each of the server devices may include a communication device and/or a computing device. Each of the network devices may include a device capable of receiving, processing, storing, routing, and/or providing traffic (e.g., a packet, other information or metadata, and/or the like) in a manner described herein. As shown in FIG. 1A, a first server device may provide an Ethernet frame to a first CE network device, and the first CE network device may provide the Ethernet frame to a first PE network device. The MPLS network may include different layers, such as MPLS, bit index explicit replication (BIER), Ethernet, and/or the like.

Figure 1B:
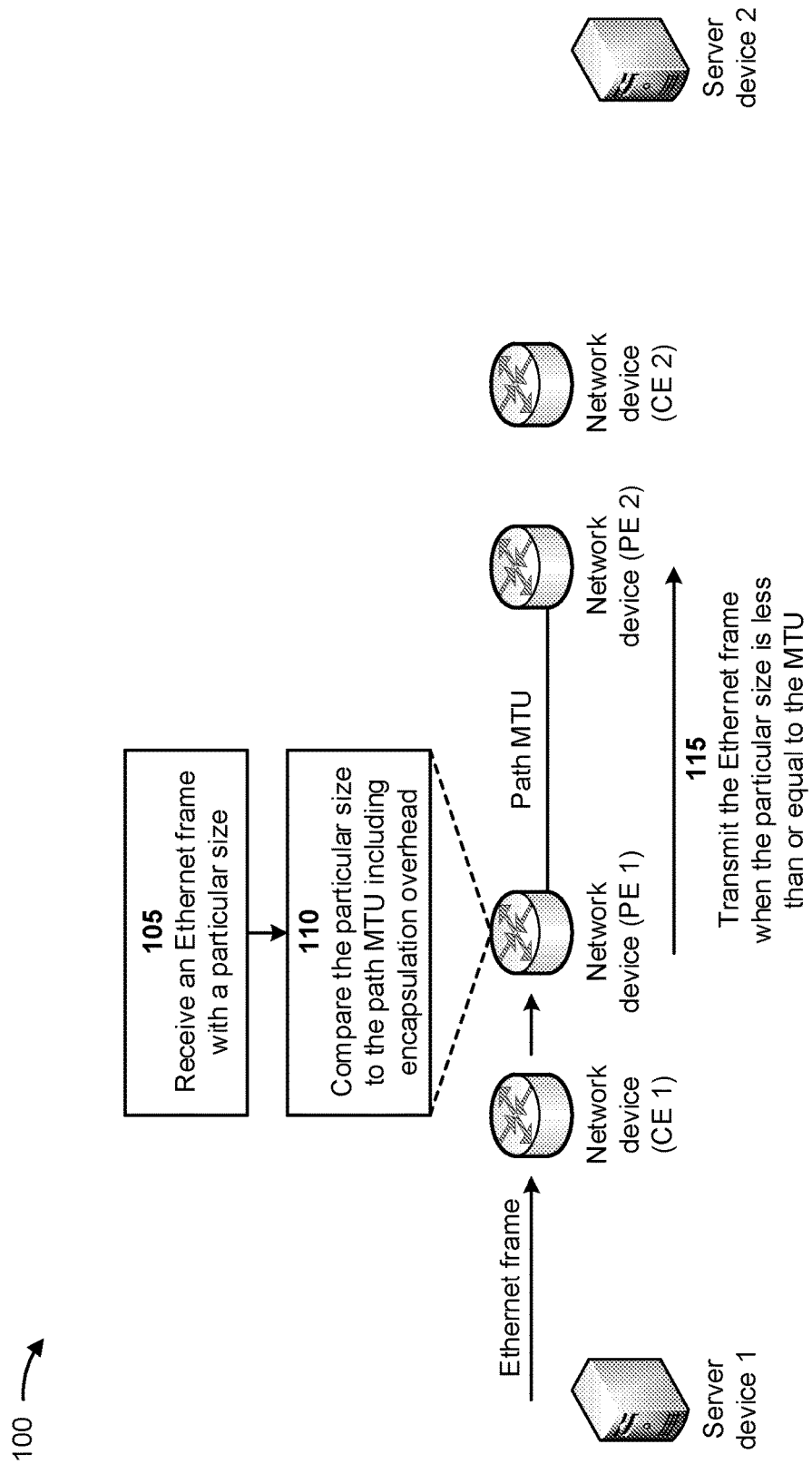

As shown in FIG. 1B, and by reference number 105, the first PE network device may receive the Ethernet frame from the first CE network device. The Ethernet frame may have a particular size (e.g., in bytes). A path between the first PE network device and a second PE network device may handle a particular size (e.g., a path MTU measured in bytes) associated with packets transported along the path, including any encapsulation overhead, labels, etc.

As further shown in FIG. 1B, and by reference number 110, the first PE network device may compare the particular size of the Ethernet frame to the path MTU to determine whether the particular size is greater than the path MTU. As shown by reference number 115, the first PE network device may forward the Ethernet frame to the second PE network device, via the path, when the particular size is less than or equal to the MTU.

Figure 1C:
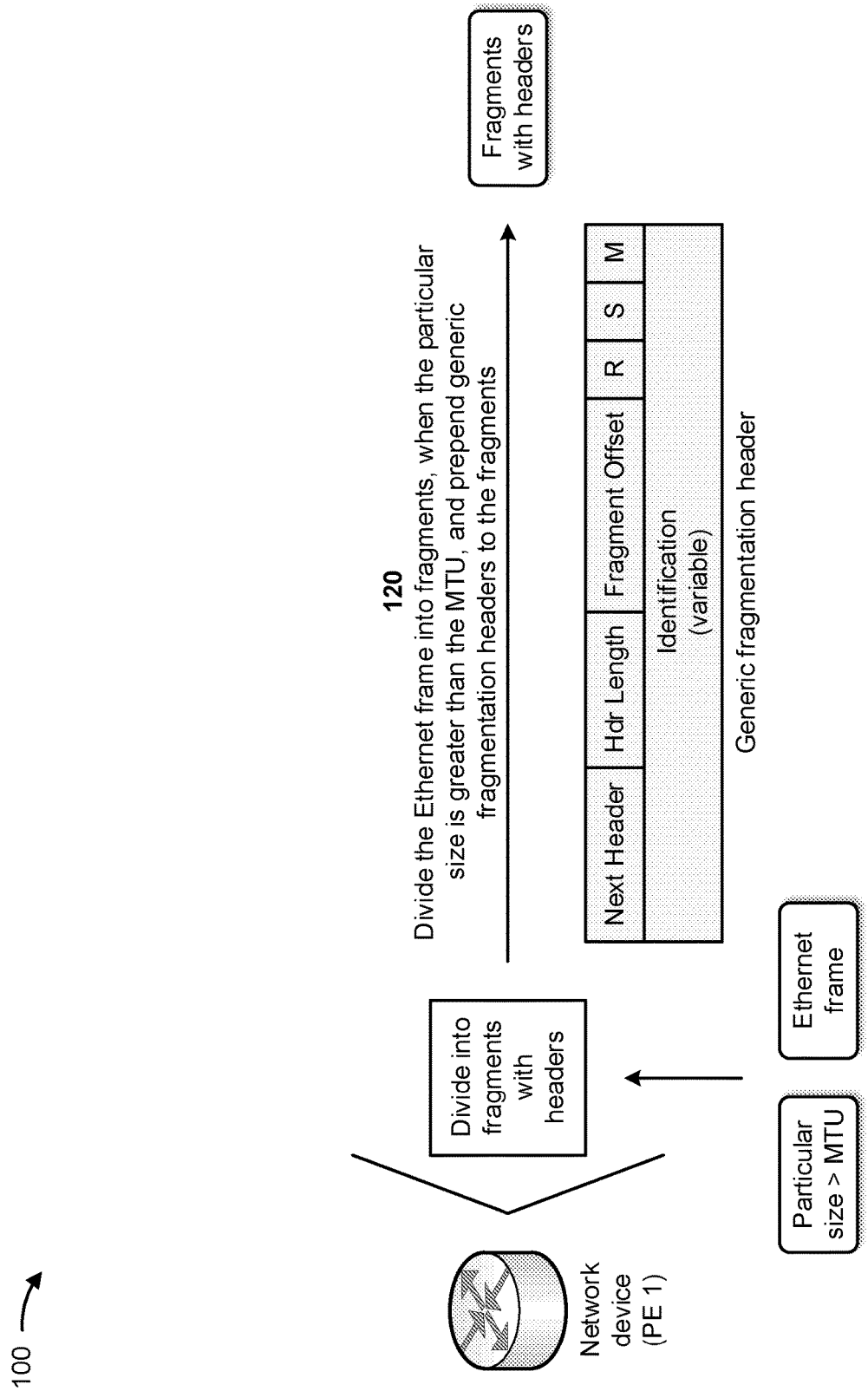

As shown in FIG. 1C, and by reference number 120, when the particular size is greater than the MTU, the first PE network device may divide the Ethernet frame into fragments and may prepend generic fragmentation headers to the fragments to generate fragments with headers. As further shown, the generic fragmentation header may include a next header field, a header length field, a fragment offset field, an R flag bit, an S flag bit, an M flag bit, and an identification field.

The next header field may include a value from an Internet Protocol Numbers registry. The header length field may include a number of octets of the entire header. The fragment offset field may be measured in units of eight-byte blocks and may specify an offset of a particular fragment relative to a beginning of an original unfragmented frame. The R flag bit may be reserved and may be zero on transmitting and ignored on receiving. If the S flag bit is clear (e.g., not set), a context for the identification field is provided by an outer header, and source-identifying information in the outer header is used. If the S flag bit is set, the identification field may encode both source-identifying information (e.g., an IP address of the first PE network device) and an identification number unique within the first PE network device. The M flag bit may include a value of zero if the fragment is a last (e.g., rightmost) fragment, else the M flag bit may include a value of one. The variable identification field may be at least four octets long.

An outer header of a fragment may identify that a generic fragmentation header follows and may include source-identifying information. If the outer header is bit index explicit replication (BIER), a value for a proto field in the BIER header may identify that a generic fragmentation header follows. If the S flag bit is clear, a BFIR-id field in the BIER header may provide context for the identification field. If the outer header is MPLS, the S flag bit may be clear if the label preceding the generic fragmentation header identifies the sending BIER Forwarding Router (BFR) in addition to indicating that a generic fragmentation header follows.

Figure 1D:
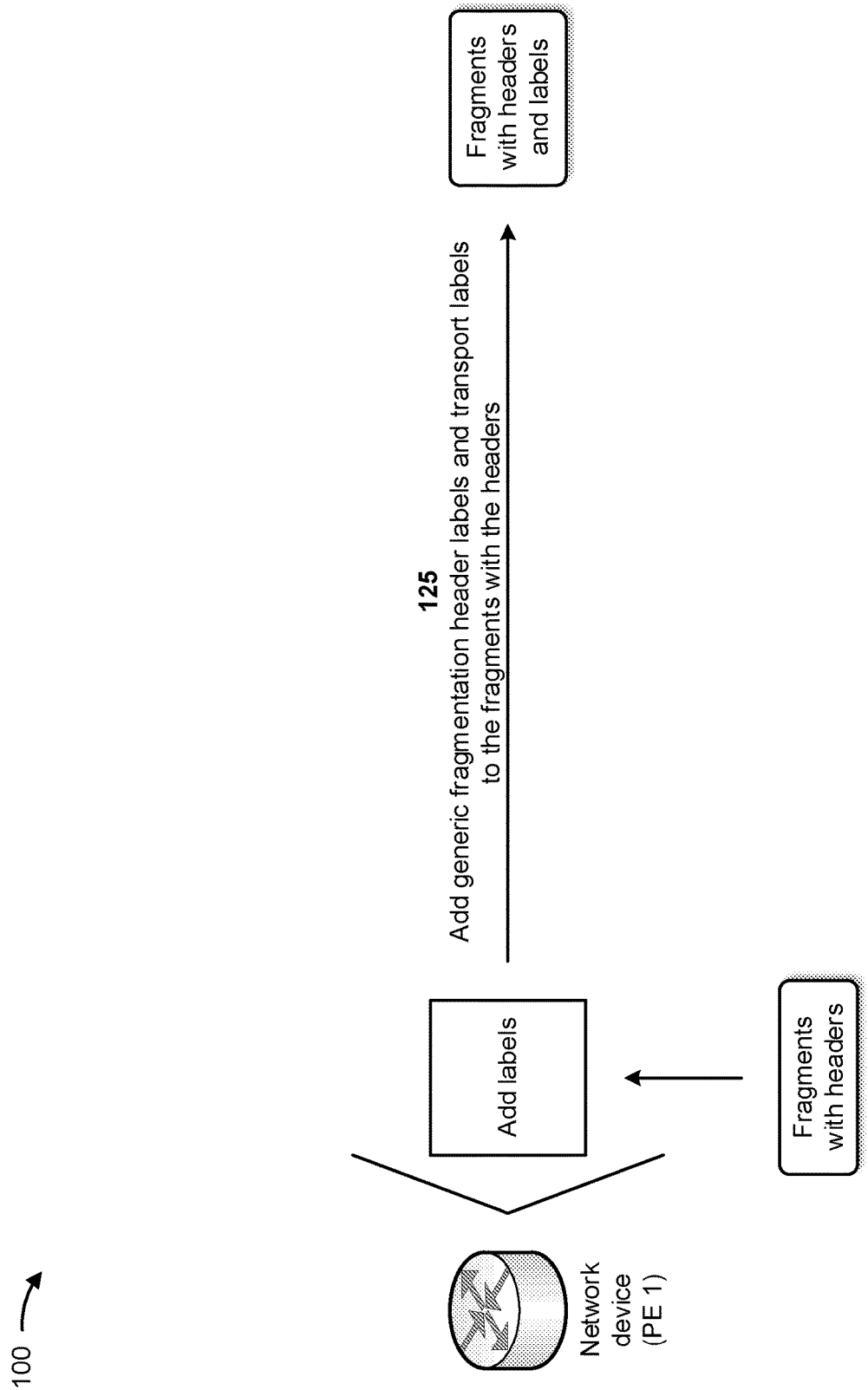

As shown in FIG. 1D, and by reference number 125, the first PE network device may add generic fragmentation header labels and transport labels to the fragments with the headers to generate fragments with headers and labels. The generic fragmentation header labels may indicate that the generic fragmentation header follows. The generic fragmentation header labels and transport labels may be advertised by the second PE network device.

Figure 1E:
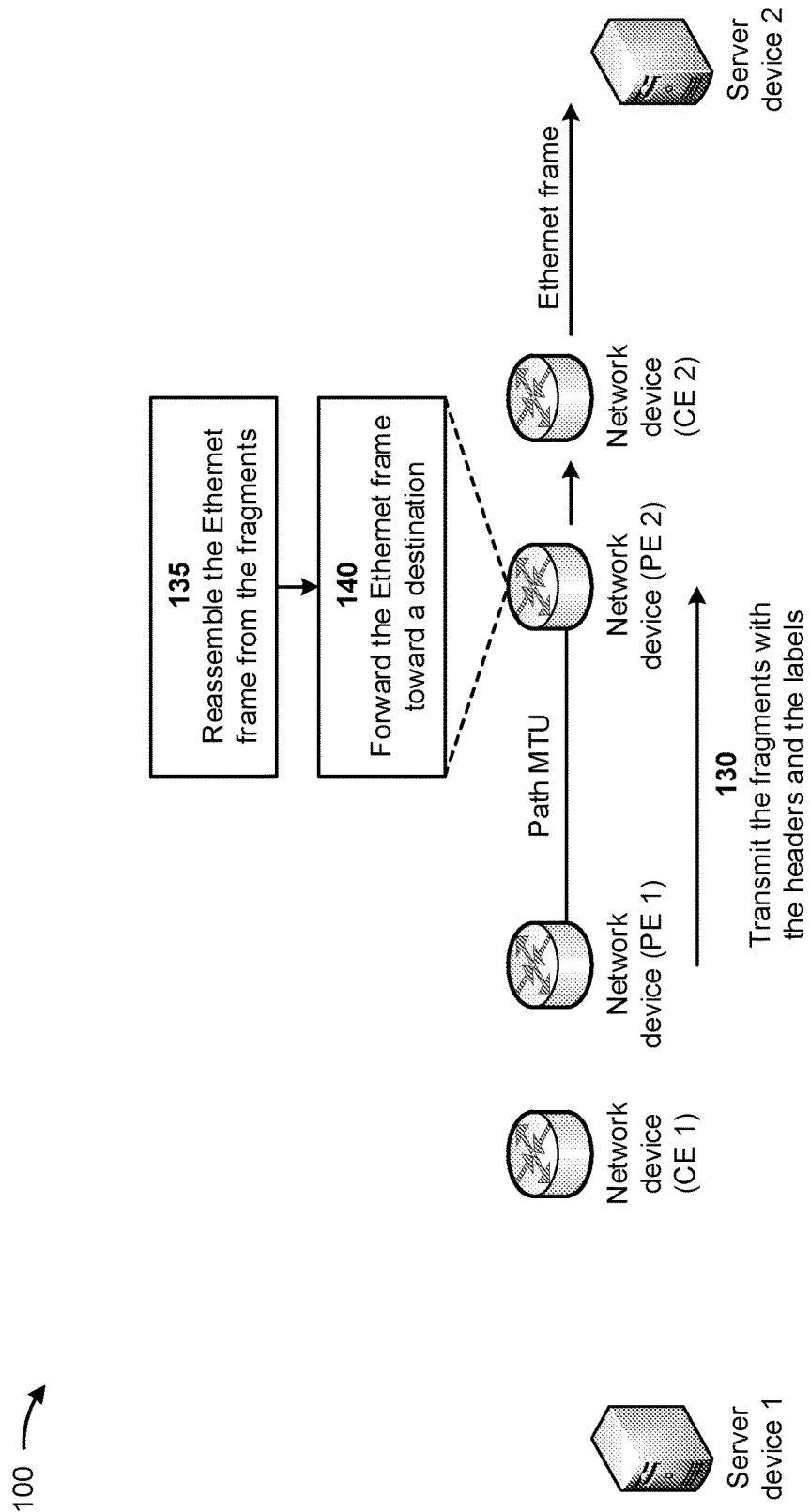

As shown in FIG. 1E, and by reference number 130, the first PE network device may transmit the fragments with the headers and the labels to the second PE network device, via the path. As shown by reference number 135, the second PE network device may reassemble the Ethernet frame from the fragments with the headers and the labels. For example, the second PE network device may utilize the information from the headers and the labels to determine how to reassemble the Ethernet frame from the fragments and may reassemble the Ethernet frame based on the information. As shown by reference number 140, the second PE network device may forward the Ethernet frame toward a destination. For example, the second PE network device may forward the Ethernet frame to the second CE network device, and the second CE network device may forward the Ethernet frame to the second server device.

When the generic fragmentation header is used with MPLS, a preceding label may indicate that a generic fragmentation header follows, and optionally may identify a network device that performs the fragmentation. The preceding label may be signaled via a border gateway protocol (BGP) or an interior gateway protocol (IGP), as specified below, or via a special purpose label allocated for the purpose of including a fragmentation header. For BGP signaling, a transitive BGP generic fragmentation header label attribute may be provided. The attribute may include one or more (node, label) pairs. Each pair may be for one node, but if the node address is zero, then the same label may be used by all sending nodes and does not identify the sending node. The attribute may include a label field with an MPLS label encoded as three octets, where a high-order twenty bits contain a label value. The attribute may include a node address of zero, which may indicate that a following label, when used in a label stack of a data packet, includes a generic fragmentation header. The attribute may include a node address indicating that a following label, when used in a label stack of a data packet, will both indicate that a generic fragmentation header follows and identify a sending network device. The node address may include a unicast address, indicating that a following label, when used in a label stack of a data packet, will both indicate that a generic fragmentation header follows and identify a sending network device.

If a network device supports generic fragmentation headers with MPLS, the network device may attach the attribute in the BGP routes for local addresses. A border network device may remove the attribute if no network device beyond a border will use generic fragmentation headers with MPLS to send traffic to corresponding addresses. A network device that supports the attribute may determine that the attribute is malformed if a node address field does not contain a unicast address or zero. The attribute may also be malformed if the node address field is expected to be an IPv4 address and a length of the attribute is not a multiple of seven, or the node address field is expected to be an IPv6 address and the length of the attribute is not a multiple of nineteen. An address family indicator (AFI) of a BGP route to which the attribute is attached may provide information about whether the node address field contains an IPv4 address or an IPv6 address.

For IGP signaling, an open shortest path first version 2 (OSPFv2) generic fragmentation header labels sub type-length-value (sub-TLV) of an OSPFv2 extended prefix TLV may be provided, with a value part being the same as the BGP generic fragmentation header labels attribute described above. If an OSPFv2 network device supports the generic fragmentation header with MPLS, generic fragmentation header labels sub-TLV in the extended prefix TLV may be attached to local addresses advertised in an OSPFv2 extended prefix opaque link-state advertisement (LSA). An open shortest path first version 3 (OSPFv3) generic fragmentation header labels sub-TLV of OSPFv3 intra/inter-area-prefix TLVs may be provided, with a value part being the same as the BGP generic fragmentation header labels attribute described above. If an OSPFv3 network device supports the generic fragmentation header with MPLS, generic fragmentation header labels sub-TLV in the intra-area-prefix TLV may be attached to local addresses. An intermediate system to intermediate system (ISIS) generic fragmentation header labels sub-TLV of ISIS prefix-reachability TLV may be provided, with a value part being the same as BGP generic fragmentation header labels attribute described above. If an ISIS network device supports the generic fragmentation header with MPLS, sub-TLV to the prefix-reachability TLV may be attached to local addresses. For both OSPF and ISIS, when advertising a prefix from one area/level to another, if there is a generic fragmentation header labels TLV attached in a source area/level, the TLV may be attached in a target area/level and a prefix may not be summarized.

In this way, the network device performs generic layer independent fragmentation of non-IP frames. The network device may fragment an Ethernet frame without incurring IP overhead or requiring IP transportation. The network device may extract an independent fragmentation function out of IP for these use cases. For example, if an Ethernet type is assigned for the generic fragmentation header, the network device may utilize the generic fragmentation header to fragment frames without involving IP or MPLS. This, in turn, conserves computing resources, networking resources, and/or the like that would otherwise have been wasted in creating unnecessary IP encapsulation overhead, creating network congestion with the IP encapsulation overhead, dropping packets due to the network congestion, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
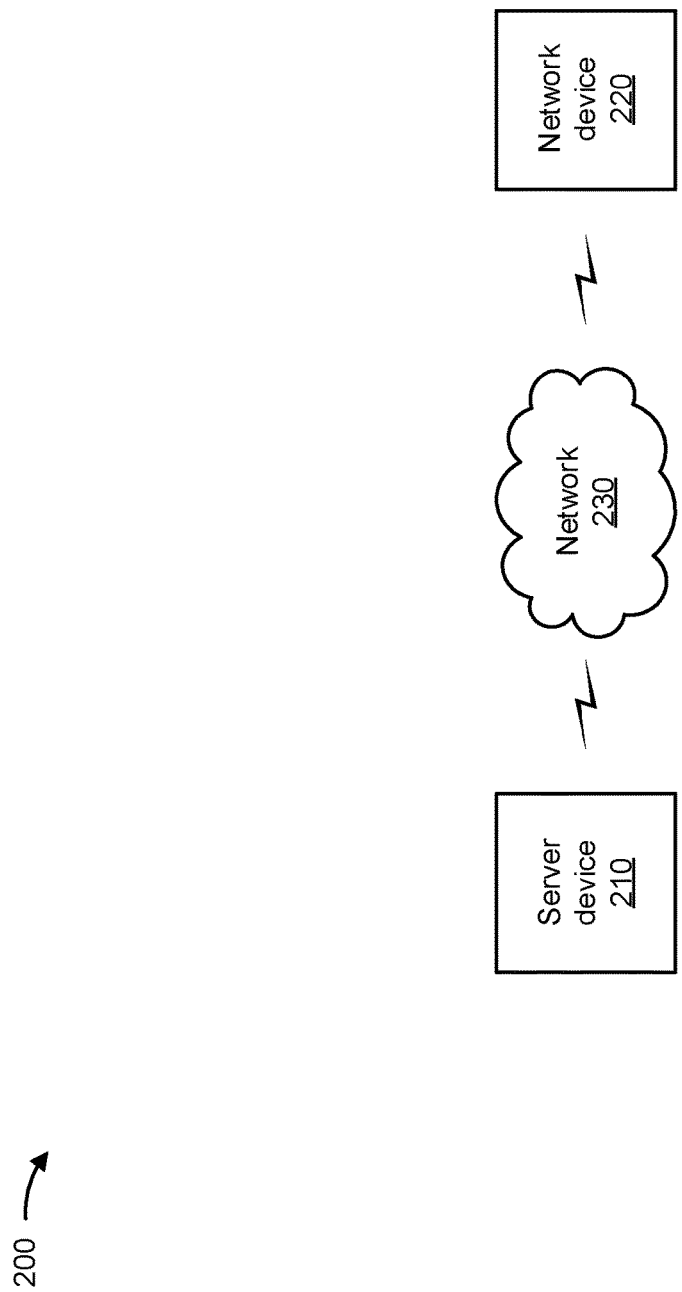
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a network device 220, and/or a network 230. Devices and/or elements of environment 200 may interconnect via wired connections and/or wireless connections.

Server device 210 includes one or more devices capable of receiving, generating, storing, processing, providing, and/ or routing information, as described elsewhere herein. Server device 210 may include a communication device and/or a computing device. For example, server device 210 may include a server, such as an application server, a client server, a web server, a database server, a host server, a proxy server, a virtual server (e.g., executing on computing hardware), or a server in a cloud computing system. In some implementations, server device 210 includes computing hardware used in a cloud computing environment.

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computing devices of a cloud computing environment or a data center. In some implementations, a group of network devices 220 may be a group of data center nodes that are used to route traffic flow through a network.

Network 230 includes one or more wired and/or wireless networks. For example, network 230 may include a cellular network, a public land mobile network (PLMN), a LAN, a wide area network (WAN), a private network, the Internet, and/or the like, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
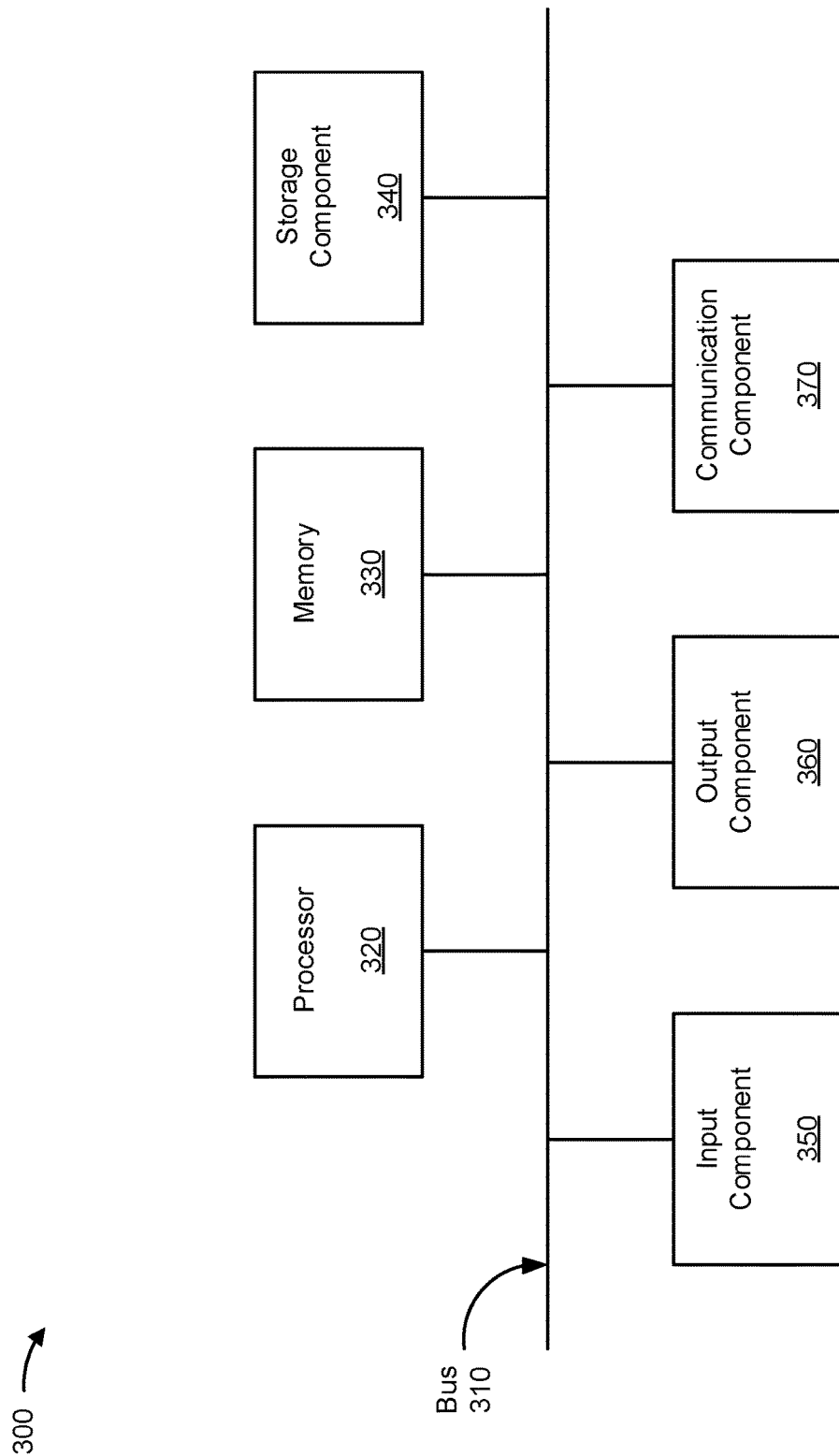
FIG. 3 is a diagram of example components of one or more devices of FIG. 2.

FIG. 3 is a diagram of example components of a device 300, which may correspond to server device 210 and/or network device 220. In some implementations, server device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
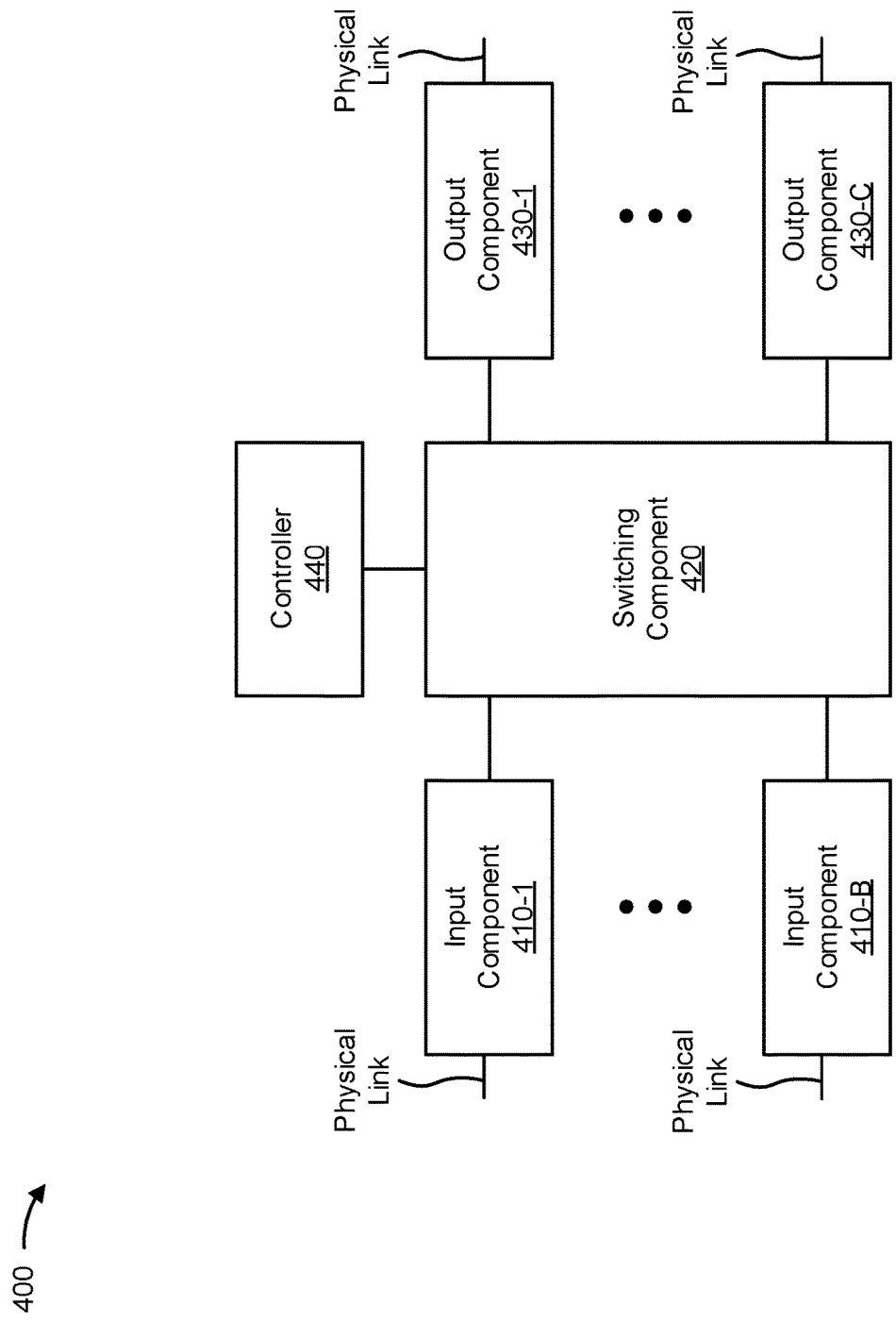
FIG. 4 is a diagram of example components of a network device of FIG. 2.

FIG. 4 is a diagram of example components of a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
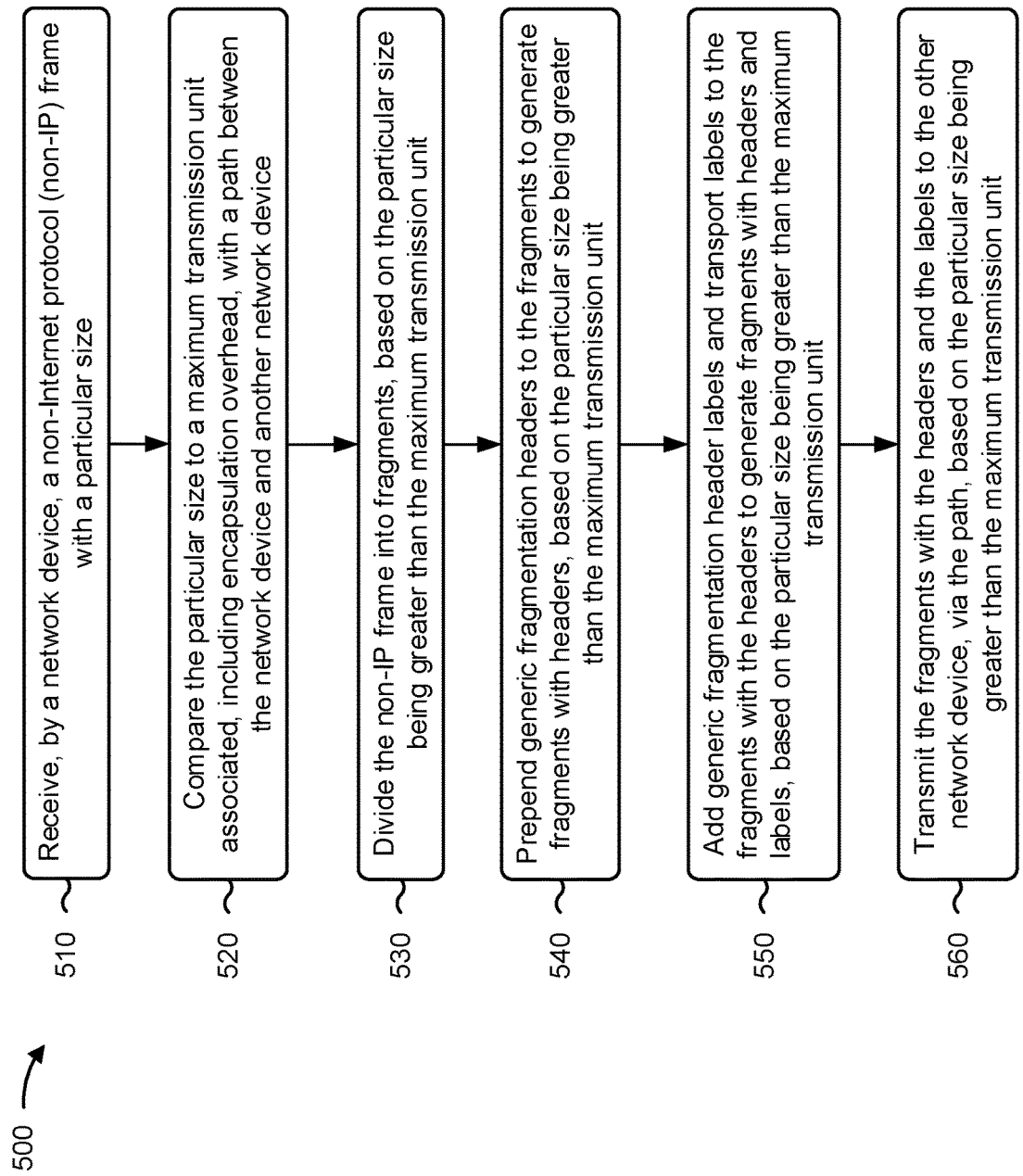
FIG. 5 is a flowchart of an example process for generic layer independent fragmentation of non-Internet protocol (non-IP) frames.

FIG. 5 is a flowchart of an example process 500 for performing generic layer independent fragmentation of non-IP (e.g., Ethernet) frames. In some implementations, one or more process blocks of FIG. 5 may be performed by a network device (e.g., network device 220). In some implementations, one or more process blocks of FIG. 5 may be performed by another device or a group of devices separate from or including the network device, such as a server device (e.g., server device 210). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving a non-Internet protocol (non-IP) frame with a particular size (block 510). For example, the network device may receive a non-Internet protocol (non-IP) frame with a particular size, as described above.

As further shown in FIG. 5, process 500 may include comparing the particular size to a maximum transmission unit, including encapsulation overhead, associated with a path between the network device and another network device (block 520). For example, the network device may compare the particular size to a maximum transmission unit, including encapsulation overhead, associated with a path between the network device and another network device, as described above.

As further shown in FIG. 5, process 500 may include dividing the non-IP frame into fragments, based on the particular size being greater than the maximum transmission unit (block 530). For example, the network device may divide the non-IP frame into fragments, based on the particular size being greater than the maximum transmission unit, as described above.

As further shown in FIG. 5, process 500 may include prepending generic fragmentation headers to the fragments to generate fragments with headers, based on the particular size being greater than the maximum transmission unit (block 540). For example, the network device may prepend generic fragmentation headers to the fragments to generate fragments with headers, based on the particular size being greater than the maximum transmission unit, as described above.

As further shown in FIG. 5, process 500 may include adding generic fragmentation header labels and transport labels to the fragments with the headers to generate fragments with headers and labels, based on the particular size being greater than the maximum transmission unit (block 550). For example, the network device may add generic fragmentation header labels and transport labels to the fragments with the headers to generate fragments with headers and labels, based on the particular size being greater than the maximum transmission unit, as described above.

As further shown in FIG. 5, process 500 may include transmitting the fragments with the headers and the labels to the other network device, via the path, based on the particular size being greater than the maximum transmission unit (block 560). For example, the network device may transmit the fragments with the headers and the labels to the other network device, via the path, based on the particular size being greater than the maximum transmission unit, as described above.

Process 500 may include additional implementations, such as any single implementation or any combination of implementations described below and/or in connection with one or more other processes described elsewhere herein.

In a first implementation, process 500 includes transmitting the non-IP frame to the other network device, via the path, based on the particular size being less than the maximum transmission unit associated with the path.

In a second implementation, alone or in combination with the first implementation, the generic fragmentation headers include one or more of a next header field, a header length field, a fragment offset field, one or more flag bits, or an identification field.

In a third implementation, alone or in combination with one or more of the first and second implementations, when the generic fragmentation headers are associated with multiprotocol label switching, the generic fragmentation headers include preceding labels indicating that the generic fragmentation headers follow and identifying the network device.

In a fourth implementation, alone or in combination with one or more of the first and third implementations, the preceding labels indicating that the generic fragmentation headers follow are transmitted via a border gateway protocol or an interior gateway protocol.

In a fifth implementation, alone or in combination with one or more of the first through fourth implementations, the preceding labels indicating that the generic fragmentation headers follow are special purpose labels.

In a sixth implementation, alone or in combination with one or more of the first through fifth implementations, the fragments include outer headers indicating that the generic fragmentation headers follow and optionally identifying the network device.

In a seventh implementation, alone or in combination with one or more of the first through sixth implementations, each of the generic fragmentation headers includes an identification field that includes a number and encodes an address that identifies the network device.

In an eighth implementation, alone or in combination with one or more of the first through seventh implementations, each of the generic fragmentation headers includes a header length field that identifies a quantity of octets in each of the generic fragmentation headers, an identification field, and a flag bit that is not set when information identifying the network device is included in an outer header and that is set when the information identifying the network device is included in the identification field.

In a ninth implementation, alone or in combination with one or more of the first through eighth implementations, the transport labels include labels agreed upon by the network device and the other network device.

In a tenth implementation, alone or in combination with one or more of the first through ninth implementations, the non-IP frame includes one of a multiprotocol label switching frame, a bit index explicit replication frame, or an Ethernet frame.

In an eleventh implementation, alone or in combination with one or more of the first through tenth implementations, the network device includes a first provider edge network device and the other network device includes a second provider edge network device.

In a twelfth implementation, alone or in combination with one or more of the first through eleventh implementations, receiving the non-IP frame with the particular size includes receiving the non-IP frame from a customer edge network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

What is claimed is:

1. A method for fragmentation of non-Internet protocol (non-IP) frames, comprising:
   receiving, by a network device, a non IP frame with a particular size;
   dividing, by the network device, the non-IP frame into fragments based on the particular size being greater than a maximum transmission unit associated with a path of the network device;
   prepending, by the network device, generic fragmentation headers to the fragments to generate fragments with headers, based on the particular size being greater than the maximum transmission unit;
   adding, by the network device, generic fragmentation header labels and transport labels to the fragments with headers to generate fragments with headers and labels, based on the particular size being greater than the maximum transmission unit,
      wherein the generic fragmentation header labels indicate that a generic fragmentation header, of the generic fragmentation headers, follows and is associated with a border gateway protocol or an interior gateway protocol; and
   transmitting, by the network device, the fragments with headers and labels via the path based on the particular size being greater than the maximum transmission unit.

2. The method of claim 1, wherein the generic fragmentation header labels indicate that the generic fragmentation header follows.

3. The method of claim 1, wherein the path handles a particular size associated with packets transported along the path.

4. The method of claim 1, wherein the fragments include outer headers indicating that the generic fragmentation headers follow.

5. The method of claim 1, further comprising:
   receiving the non-IP frame from a customer edge (CE) network device with a larger size than a provider edge to provider edge path maximum transmission unit associated with the path.

6. The method of claim 1, further comprising:
   comparing the particular size to a maximum transmission unit associated with a path between the network device and another network device.

7. The method of claim 1, wherein the non-IP frame is a first non-IP frame, and
   wherein the method further comprises:
      transmitting a second non-IP frame to the other network device, via the path, based on the particular size being less than the maximum transmission unit associated with the path.

8. A network device, comprising:
   one or more memories; and
   one or more processors to:
      divide a non-Internet protocol (non-IP) frame with a particular size into fragments;
      prepend generic fragmentation headers to the fragments to generate fragments with headers;
      add generic fragmentation header labels and transport labels to the fragments with headers to generate fragments with headers and labels,
         wherein the generic fragmentation header labels indicate that a generic fragmentation header, of the generic fragmentation headers, follows and is associated with a border gateway protocol or an interior gateway protocol; and
      transmit the fragments with headers and labels to another network device.

9. The network device of claim 8, wherein the one or more processors, when receiving the non-IP frame with the particular size, are to:
   receive the non-IP frame from a customer edge network device.

10. The network device of claim 8, wherein, when the generic fragmentation headers are associated with multiprotocol label switching, the generic fragmentation headers include preceding labels indicating that the generic fragmentation headers follow and are transmitted via the border gateway protocol or the interior gateway protocol.

11. The network device of claim 8, wherein, when the generic fragmentation headers are associated with multiprotocol label switching, the generic fragmentation headers include preceding labels indicating that the generic fragmentation headers that follow are special purpose labels.

12. The network device of claim 8, wherein the network device includes a first provider edge network device and the other network device includes a second provider edge network device.

13. The network device of claim 8, wherein the one or more processors, to divide the non-IP frame with the particular size into fragments, are to:
   divide the non-IP frame into fragments based on the particular size being greater than a maximum transmission unit associated with a path of the network device.

14. The network device of claim 8, wherein the fragments include outer headers indicating that the generic fragmentation headers follow and identifying the network device.

15. A non-transitory computer-readable medium storing a set of instructions, the set of instructions comprising:

one or more instructions that, when executed by one or more processors of a network device, cause the network device to:
- receive a non-Internet protocol (non-IP) frame with a particular size;
- divide the non-IP frame into fragments based on the particular size being greater than a maximum transmission unit associated with a path between the network device and another network device;
- prepend generic fragmentation headers to the fragments to generate fragments with headers;
- add generic fragmentation header labels and transport labels to the fragments with headers to generate fragments with headers and labels,
  - wherein the generic fragmentation header labels indicate that a generic fragmentation header, of the generic fragmentation headers, follows and is associated with a border gateway protocol or an interior gateway protocol; and
- transmit the fragments with headers and labels to the other network device via the path.

16. The non-transitory computer-readable medium of claim 15, wherein the generic fragmentation header labels indicate that the generic fragmentation header follows.

17. The non-transitory computer-readable medium of claim 15, wherein the path handles a particular size associated with packets transported along the path which include any encapsulation overhead and labels.

18. The non-transitory computer-readable medium of claim 15, wherein the fragments include outer headers indicating that the generic fragmentation headers follow.

19. The non-transitory computer-readable medium of claim 15, wherein the one or more instructions further cause the network device to:
- compare the particular size to a maximum transmission unit associated with a path between the network device and the other network device.

20. The non-transitory computer-readable medium of claim 15, wherein the non-IP frame is a first non-IP frame, and
- wherein the one or more instructions further cause the network device to:
  - transmit a second non-IP frame to the other network device, via the path, based on the particular size being less than the maximum transmission unit associated with the path.

* * * * *